United States Patent
Imanishi (10) Patent No.: US 8,145,028 B2
(45) Date of Patent: Mar. 27, 2012

(54) OPTICAL DISK DEVICE

(75) Inventor: Kanji Imanishi, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 935 days.

(21) Appl. No.: 12/145,069

(22) Filed: Jun. 24, 2008

(65) Prior Publication Data

US 2009/0010624 A1    Jan. 8, 2009

(30) Foreign Application Priority Data

Jul. 3, 2007    (JP) ................................. 2007-174944

(51) Int. Cl.
*H04N 5/00*    (2006.01)

(52) U.S. Cl. ........................................................ 386/126

(58) Field of Classification Search .................. 386/126, 386/205, 248, E5.064
See application file for complete search history.

(56) References Cited

U.S. PATENT DOCUMENTS

2007/0092212 A1 * 4/2007 Kikuchi et al. ................. 386/95
2007/0092217 A1 * 4/2007 Nakashika et al. ............. 386/95

FOREIGN PATENT DOCUMENTS

JP    2002133837 A1    5/2002

* cited by examiner

*Primary Examiner* — Ellen Tran
(74) *Attorney, Agent, or Firm* — Pillsbury Winthrop Shaw Pittman, LLP (57) ABSTRACT

This optical disk device includes a video recording means, a replay means, and an actuation means. The video recording means performs video recording of contents data upon an optical disk cell by cell. The replay means performs replay of the contents data, and performs special replay which differs from the replay by one or more of replay speed and replay direction. And the actuation means designates a desired predetermined time instant. During the video recording, the video recording means records upon the optical disk recording position information which specifies the recording position upon the optical disk of the cell which is video recorded at the predetermined time instant. Moreover, during performance of the special replay, when the special replay arrives at the cell which is corresponding to the recording position information, the replay means stops the special replay and starts the replay from that cell.

4 Claims, 10 Drawing Sheets

VIDEO RECORDING APPOINTMENTS

| DATE | CH | START | END | MODE | TRICK |
|------|------|-------|-------|------|-------|
| 4/18 | 4CH | 19:00 | 21:00 | SP | OFF |
| 4/20 | 10CH | 10:00 | 13:30 | LP | ON |
| 4/21 | 12CH | 21:00 | 23:00 | LP | ON |

OPTICAL DISK DEVICE

CROSS REFERENCE

This Nonprovisional application claims priority under 35 U.S.C. §119(a) on Patent Application No. 2007-174944 filed in Japan on Jul. 3, 2007, the entire contents of which are hereby incorporated by reference.

BACKGROUND OF THE INVENTION

In the prior art, optical disk devices which perform video recording of contents such as television programs or the like upon optical disks such as DVDs (Digital Versatile Disks) and the like, and which replay these contents which have been video recorded, are per se well known and widespread.

When using this type of prior art optical disk device, the user sets, using a remote control or the like which is accessory to the device main body, as video recording appointment information, a video recording start time, a video recording period, the channel upon which the program which he desires will be distributed, and the like. When this is done, the optical disk device performs video recording upon an optical disk of the appointed television program at the date and time that have been appointed. By doing this, the user is able to record the desired television program upon the optical disk.

And, after this video recording has been completed, when the user commands replay of the television program which has thus been video recorded upon the optical disk, the optical disk device replays the television program upon a television or the like which is connected to the device main body. Due to this, the user is able to view the desired television program upon the television or the like.

At this time, if the user only wishes to view a single scene or section of the television program, then sometimes he fast forwards the television program which is recorded upon the optical disk forward to the position at which he wishes to start viewing (for example forward to the start of the single section in the television program which he wishes to view). In this case, the user waits while checking the television program which is being replayed at high speed upon the above described television, until the optical disk drive reaches the position at which he desires to start viewing. And, when the fast forward replay reaches the position at which the user desires to start viewing, by using the remote control described above, he commands the optical disk device to replay the optical disk from this point. As a result, the optical disk device starts to replay the television program from the position at which this command was issued. Here by fast forward is meant, high speed replaying at a faster speed than the normal replay speed. Moreover by rewinding is meant replay in the opposite direction, in which replay is performed in the opposite direction to the direction in which normal replaying is normally performed.

It should be understood that a recording and replay device is proposed in Japanese Laid-Open Patent Publication 2002-133837.

However it often happens that, even though the user has commanded the device main body to perform replay of the optical disk, when starting this replaying, the position at which the user desires to start viewing (for example the start of a single section of a television program) is skipped over and missed. The reason for this is that, after the user has checked with the television the position at which he wishes to start viewing, he commands the optical disk device to replay the optical disk using the above described remote control, and inevitably there is a time lag until this command is executed.

If the position at which the user wishes to start viewing has been skipped over, then the user is required to rewind for a second time and to return back to before the position at which he wishes to start viewing, and then to issue a replay command for a second time, and this actuation requires an extremely great amount of trouble. Accordingly, with a prior art optical disk device, the convenience of use from the point of view of the user is bad.

The present invention has been conceived in order to solve this type of problem with the prior art, and it takes it as its object to provide an optical disk device with which, even when performing fast forwarding of a television program, the user can reliably start replay from any position at which he desires to start viewing, so that the convenience of use from the point of view of the user is enhanced.

SUMMARY OF THE INVENTION

The optical disk device of the present invention comprises a video recording means, a replay means, and an actuation means. The video recording means performs video recording of contents data upon an optical disk cell by cell.

The replay means reads the contents data from the optical disk cell by cell, and, along with performing normal replaying of the contents data, also performs special replay which differs from normal replaying by one or more of replay speed and replay direction (replay in a direction which is the same as the normal replaying, or replay in the opposite direction).

And the actuation means designates a desired predetermined time instant from within the time period over which video recording is performed by the video recording means.

During the video recording, the video recording means records upon the optical disk recording position information which specifies the recording position upon the optical disk of the cell which is video recorded at the predetermined time instant designated by the actuation means.

Moreover, if the recording position information is recorded upon the optical disk, during performance of special replay from the optical disk, when the special replay arrives at the cell which is present at the recording position specified in the recording position information, the replay means stops the special replay and starts normal replaying from that cell.

DETAILED DESCRIPTION OF THE INVENTION

An optical disk device which is an embodiment of the present invention will now be explained.

Figure 1:
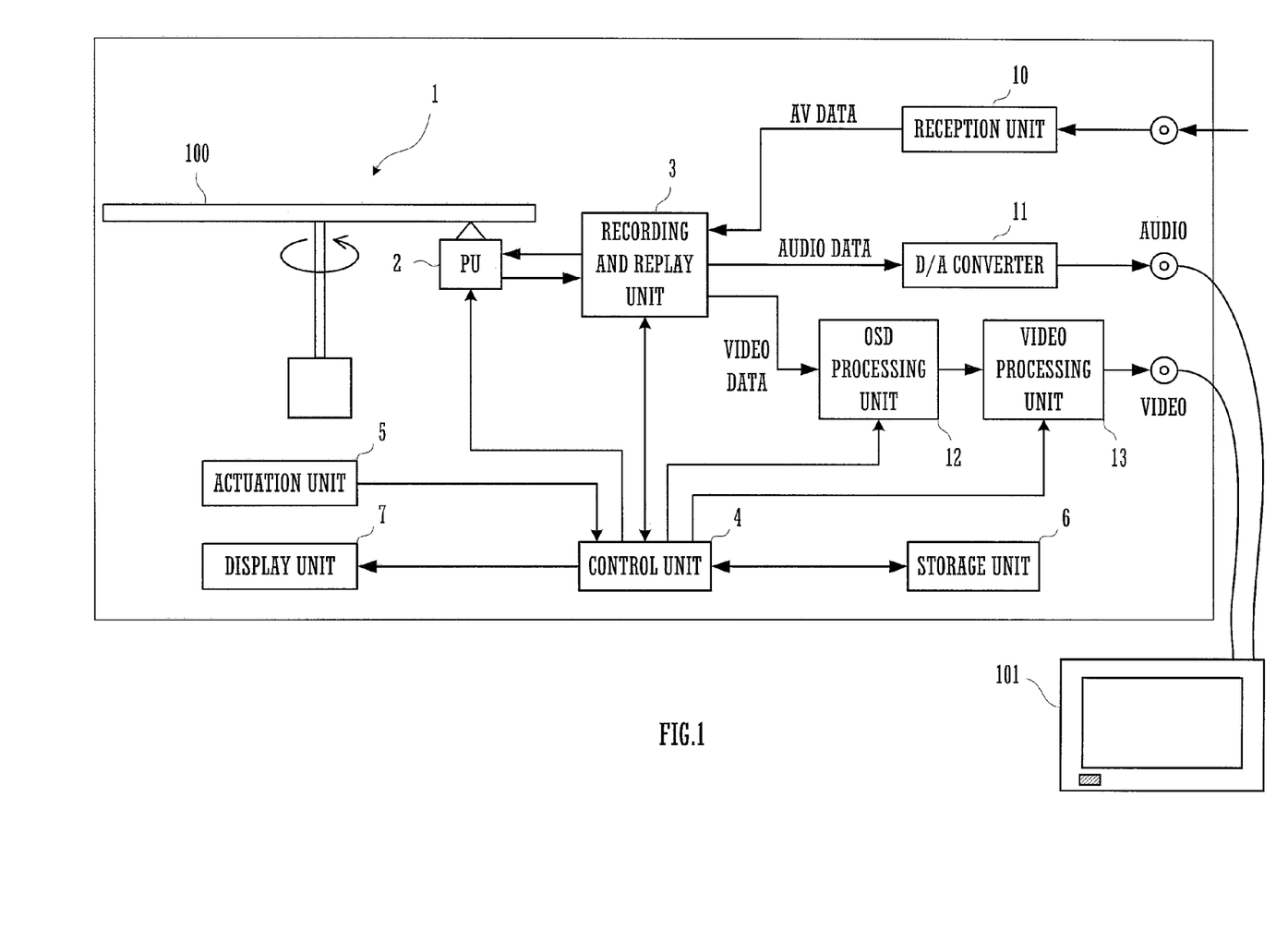
FIG. 1 is a block diagram showing the main structure of an optical disk device which is an embodiment of the present invention.

FIG. 1 is a block diagram showing the main structure of an optical disk device which is an embodiment of the present invention. The optical disk device 1 comprises: a control unit 4 which controls the operation of the various sections of the optical disk device 1; a pickup head 2 (hereinafter termed the "PU head 2") which performs recording of data upon an optical disk 100 ard reading out of data therefrom; a recording and replay unit 3 such as an RF amp or the like; an actuation unit 5 which receives actuation by the user; a display unit 7 which displays information; a storage unit 6 which stores data; a D/A converter 11 which converts audio data into an analog audio replay signal; a video processing unit 13 which converts video data into an analog replay video signal; an OSD processing unit 12 which creates a synthetic image in which an OSD (On Screen Display) picture is superimposed over an image based upon the decoded video signal; and a reception unit 10 which receives a TV broadcast signal and acquires AV (audio and video) data therefrom.

The optical disk device 1 is a so called DVD recorder. Moreover, the optical disk 100 is a recordable type optical disk. The optical disk 100 may be, for example, a DVD-R, a DVD+R, a DVD-RW, a DVD+RW, a DVD-RAM, or a Blu-ray disk.

The PU head 2 comprises a laser diode (LD), a collimator lens, a beam splitter, an objective lens, a photodetector, a thread motor, and an actuator, none of which is shown in the figures.

The PU head 2 is mounted upon a shaft which extends along the radial direction of the optical disk 100, so as to shift freely thereupon. And the thread motor shifts the PU head 2 in the radial direction of the optical disk 100.

The LD is a light source which outputs laser light. The photodetector is made up of a plurality of light reception elements, and detects light reflected from the optical disk 100.

First, the operation during reading will be explained.

The PU head 2 irradiates laser light of read power upon the optical disk 100, and detects the light reflected from the optical disk 100 with the photodetector. By doing this, the information which is recorded upon the optical disk 100 is read out optically.

The recording and replay unit 3 generates an RF signal based upon the output of the plurality of light reception elements of the PU head 2, and amplifies this RF signal. And the recording and replay unit 3 processes this RF signal and extracts data therefrom. Here, the data such as video and audio and the like which is extracted is encoded, for example, by MPEG. And the recording and replay unit 3 decodes this data such as video and audio and the like. Finally, the recording and replay unit 3 outputs the audio data to the D/A converter 11 and the video data to the OSD processing unit 12, while maintaining synchronization between these two data streams.

The D/A converter 11 converts the audio data which has been decoded into an analog audio replay signal, and outputs this audio replay signal to an external television 101.

The OSD processing unit 12 includes a video memory not shown in the figures, and creates an OSD (On Screen Display) image. This picture memory is a memory which stores the OSD data which specifies the OSD image. It would also be acceptable to arrange for the OSD processing unit 12 to change over its operation between: a case of directly outputting only video data based upon the control signal transmitted from the control unit 4; a case of creating a combined image, in which an OSD image is superimposed upon an image based upon the video data, and outputting combined video data therefore; and a case of outputting only the OSD image data for the OSD image. Operating to output only the OSD image data for the OSD image, is operation when replay is not being performed.

The video processing unit 13 converts the video data which has been inputted, or the OSD image data, or the combined video data, to an analog video replay signal which it outputs to the external television 101.

The television unit 101, which has an internal speaker, is connected to the D/A converter 11 and the video processing unit 13. This television 101 replays video based upon the video signal which is outputted from the D/A converter 11 and the video processing unit 13, and replays audio based upon the audio signal. Due to this, it is possible for the user to view a television program which is being replayed.

Next, the operation during recording will be explained.

The reception unit 10 is, for example, a tuner. The reception unit 10 extracts the TV broadcast signal of a channel which is selected by the user from an antenna which receives TV broadcasts and the like, A/D converts and digitalizes this signal, and outputs it.

And the recording and replay unit 3 encodes the data which is inputted (for example by MPEG), and outputs the resulting digital signal to the PU head 2.

And, when the digital signal from the recording and replay unit 3 is inputted, the PU head 2 controls laser light of recording power according to this digital signal, and irradiates this laser light upon the recording surface of the optical disk 100. Due to this, the user is able to perform video recording of the contents of a television program or the like upon the optical disk 100.

It should be understood that it would also be acceptable to arrange to provide the OSD display described above even during recording, and to display the image which is being recorded with the OSD display superimposed thereover.

The actuation unit 5 is provided in order for the user to input various types of command to the optical disk device 1, and a plurality of keys are provided thereupon. Commands which the user wishes to input to the optical disk device 1 are transmitted from the actuation unit 5 to the control unit 4.

Among the above described plurality of keys there are included: an appointment screen display key which displays a video recording appointment screen shown in FIGS. 4 and 5 which will be described hereinafter, for performing setting of video recording appointments; cursor keys which receive actuation for shifting a cursor 102 upon the video recording appointment screen shown in FIGS. 4 and 5; a video recording setting key for performing setting of video recording upon the video recording appointment screen; a time instant designation key which receives designation of a desired predetermined time instant from within the time period, in this video recording setting, in which video recording is to be performed; a replay key for commanding replay of the contents recorded upon the optical disk 100; a selection key for receiving selection of a replay title; a fast forward key for commanding fast forward through contents; and a video recording key for commanding recording of contents upon the optical disk 100.

The storage unit 6 may, for example, include an EEPROM. The storage unit 6 stores a control program which describes a method of controlling the various sections of the optical disk device 1.

The display unit 7 may, for example, include an LCD (Liquid Crystal Display). The display unit 7 displays time instants, the setting state of the optical disk device 1, and the like.

The control unit 4 may, for example, include a microcomputer. Moreover, it may include a RAM which serves as a working space for holding data which is being processed by the control program described above, and a timer circuit which times the current time instant. The control unit controls the various sections of the optical disk device 1, according to commands inputted to the optical disk device 1 by the user.

It should be understood that various other functions are performed in the actual optical disk device, such as tracking servo control in which the position in which the laser light is irradiated upon the optical disk during reading or recording is matched to the center of a track upon the optical disk, and focus servo control in which the focus position of the laser light is matched to the recording surface of the optical disk. However, these features are omitted from this description of this embodiment of the present invention, and from the drawings.

Here, the PU head 2, the recording and replay unit 3, the video processing unit 13, the D/A converter 11, and the control unit 4 correspond to the "replay means" of the Claims. And the PU head 2, the recording and replay unit 3, the reception unit 10, and the control unit 4 correspond to the "video recording means" of the Claims.

Figure 2:
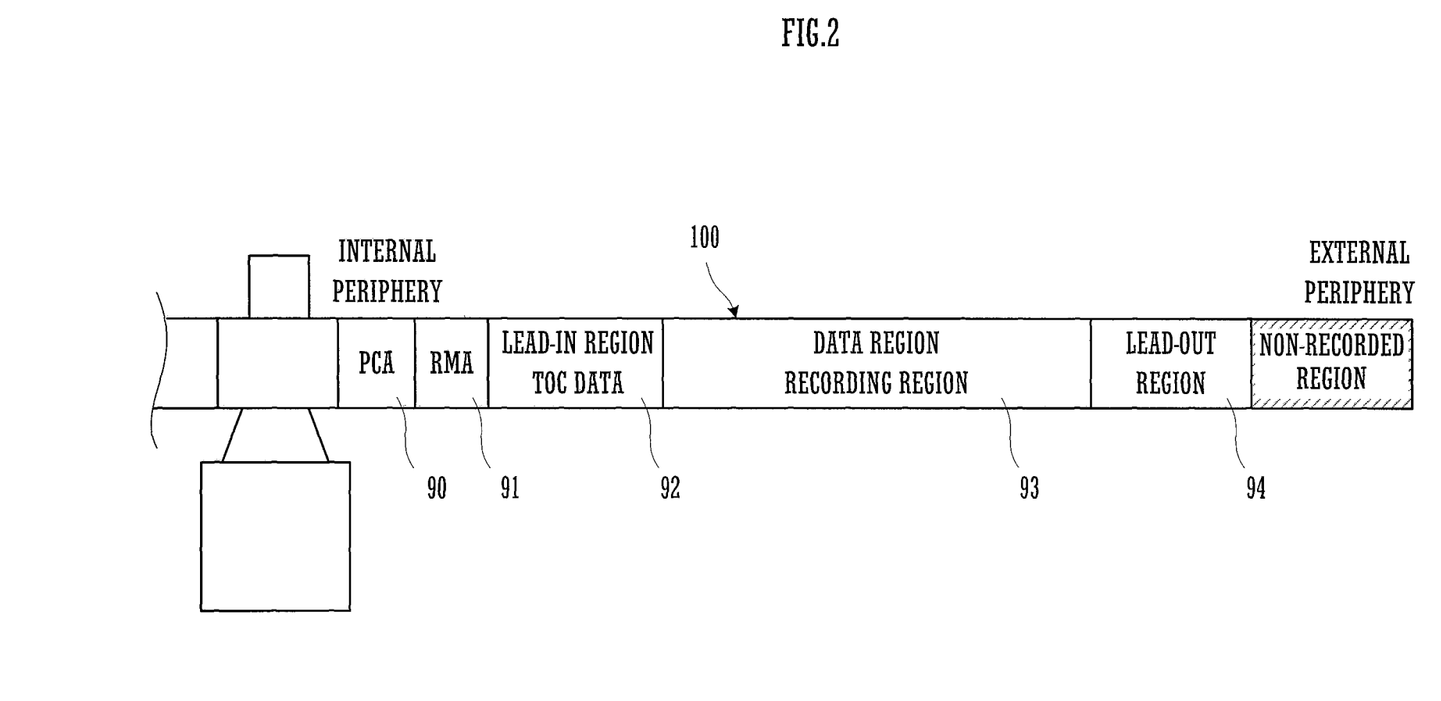
FIG. 2 is a figure showing a recorded region on an optical disk which is loaded into the optical disk device which is an embodiment of the present invention.

FIG. 2 is a figure showing a recorded region on an optical disk which is loaded into the optical disk device which is an embodiment of the present invention. From its internal periphery to its external periphery, the recording region upon the optical disk 100 is divided into a PCA 90, a RMA 91, a lead-in region 92, a data region 93, and a lead-out region 94.

The PCA 90 is a region in which calibration of the laser power is performed.

The RMA 91 is a region in which record management information required by the optical disk device 1 is recorded.

The lead-in region 92 is a region in which TOC data for the data which is recorded in the data region 93 upon the optical disk 100 is recorded. In this TOC data, there is included information specifying whether or not the stored data is finalized, the date that the data was stored, address information upon the optical disk for the stored data, and the like.

The data region 93 is a region in which the stored data is recorded.

And the lead-out region 94 is a region which is made when the stored data is finalized. This finalization is a process for putting the recording information in order in order to provide interchangeability with other optical disk devices. By performing finalization, it becomes possible to replay the optical disk 100 even upon some other optical disk device.

Figure 3A:
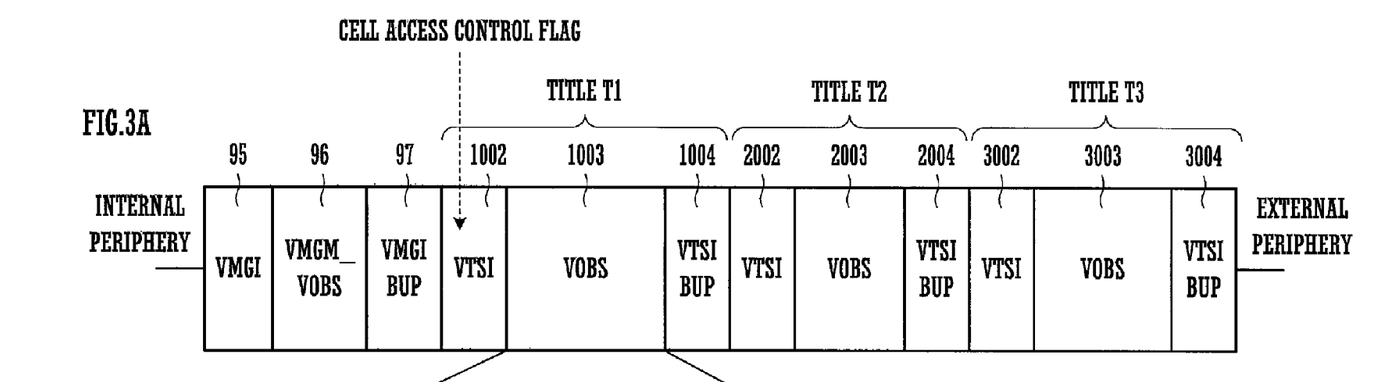
FIG. 3 is a figure showing the data structure of data upon an optical disk which is recorded in the DVD-Video format.

FIG. 3 is a figure showing the data structure of data upon an optical disk which is recorded in the DVD-Video format. As shown in FIG. 3A, upon this optical disk recorded in the DVD-Video format, in order from its internal periphery to its external periphery, there are recorded: a field VMGI 95, a field VMGM_VOBS 96, a field VMGIbup 97, and contents for titles T1 through T3.

The field VMGI (Video Manager Information) 95 contains information related to replay of the entire DVD-Video, i.e. so called root menu information. And, for example, address information for a VTSI and so on may also be included herein.

The field VMGM_VOBS (Video Object Set for VMG Menu) 96 contains a description of contents to be replayed before replay of the contents stored in any one of the fields VOBS 1003, 2003, 3003 etc. A title selection screen is included in this contents. Such a title selection screen is a screen which specifies a list of titles for the contents recorded upon the optical disk 100. Before starting replay, the optical disk device 1 requests the user to select, upon this screen, a title to be replayed.

The field VMGIbup 97 is a backup field for the field VMGI 95.

Moreover, the contents for the title T1 consists of fields VTSI (Video Title Set Information) 1002, VOBS (Video Object Set) 1003, and VTSIbup 1004 (refer to FIG. 3A). The contents for the titles T2 and T3 have a similar data structure. In the DVD-Video format, a maximum of 99 titles can be recorded together on a disk. FIG. 3A shows an example in which three titles are recorded upon the optical disk 100.

Figure 3B:
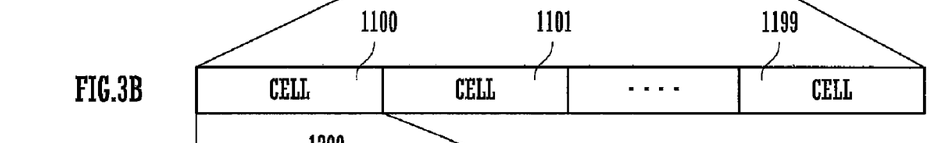

VTSI 1002 contains control information for this VOBS 1003. The actual picture frames for the contents of the title T1 (a television program or the like) are contained in VOBS 1003. As shown in FIG. 3B, this field VOBS 1003 is made up from a plurality of cells 1100 through 1199.

The field VTSIbup 1004 is a backup field for the field VTSI 1002.

In the DVD-Video format, the contents data is recorded in units of cells, which are determined in advance.

Figures 3C, 3D:
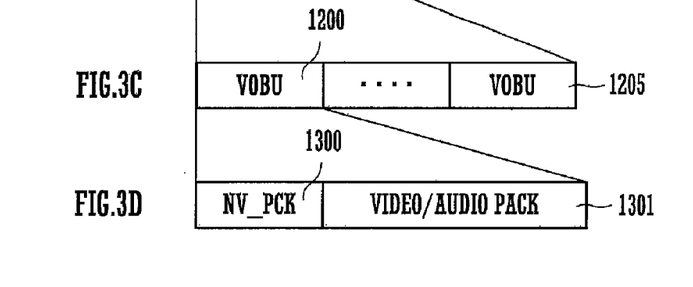

A cell 1100 consists of a plurality of VOBUs (Video Object Units) 1200 through 1205 (refer to FIG. 3C). A maximum of 255 cells may be included in a single title. Due to this, if ten hours of data is recorded upon the optical disk, then one cell may be, for example, two minutes thirty seconds long.

A NV_PCK (Navigation Pack) is placed at the head end of the VOBU 1200, and next video data and audio data (AV data) and so on are inserted in packed form (refer to FIG. 3D). Forming the contents data (the AV data) into packs and cells is performed during encoding by the recording and replay unit 3.

Now, a first scenario in which the user performs setting of a video recording appointment, a second scenario in which the user performs video recording of a television program upon the optical disk 100, and a third scenario of replaying a television program which has been video recorded upon the optical disk 100, will be explained.

First, the first scenario will be explained.

In order to set a video recording appointment, the user depresses the appointment screen display key. When he does so, the optical disk device 1 displays upon the television 101 an OSD of the video recording appointment screen shown in FIG. 4.

Figure 4:
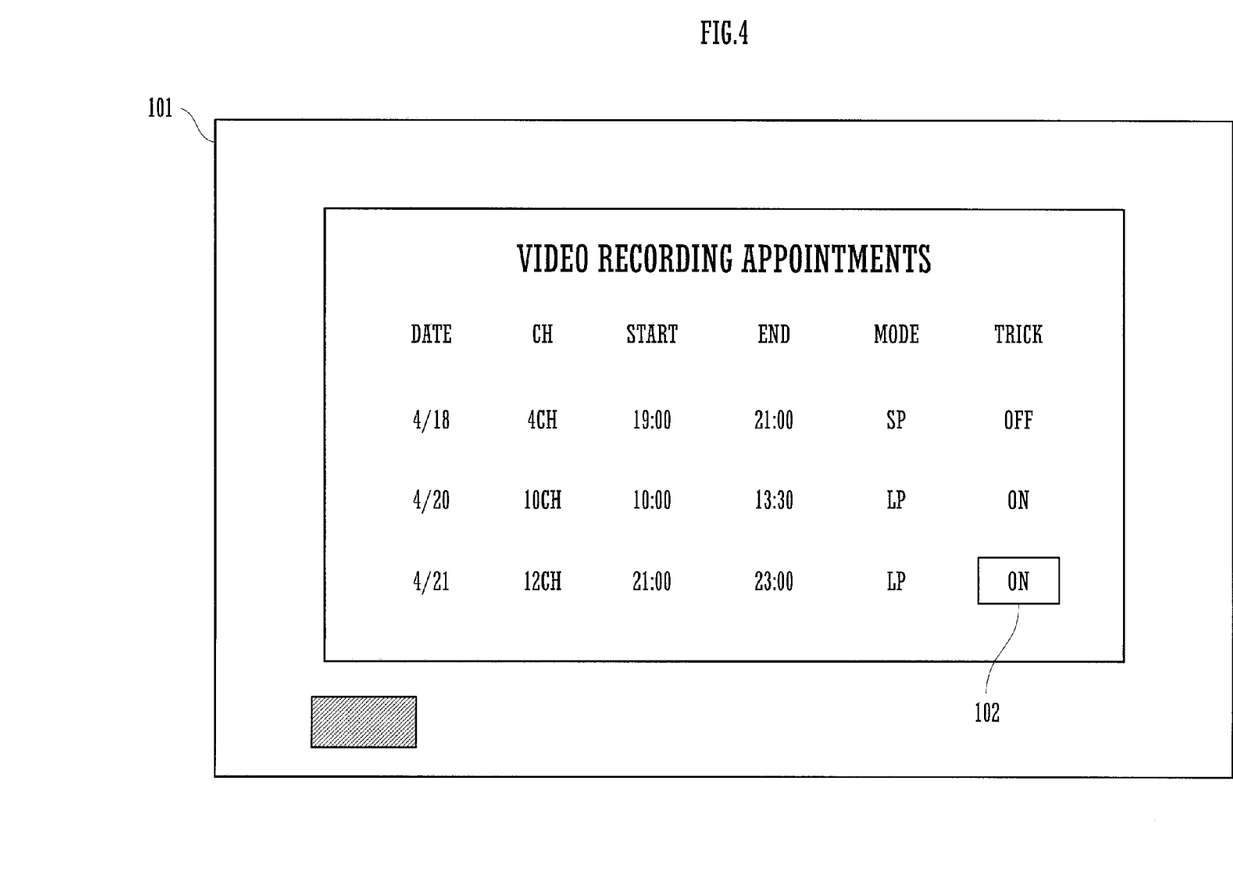
FIG. 4 is a figure showing an example of a video recording appointment screen which is displayed upon a television 101.

FIG. 4 is a figure showing an example of the video recording appointment screen which is displayed upon the television 101. And FIG. 5 is a figure showing an example of a setting screen for a special replay stop time, which is displayed upon the television 101.

The user shifts the cursor 102 with the cursor keys while looking at the video recording appointment screen shown in FIG. 4, and sets as video recording appointment information, with the video recording setting key, the video recording start date and time and the video recording end date and time (collectively termed the video recording appointment time period), the channel upon which the desired television program is to be distributed, the picture quality mode during video recording, and so on. At this time, when the user turns the item "Trick" in the right edge of the video recording screen shown in FIG. 4 to ON, the optical disk device 1 displays a setting screen for a special replay stop time, shown in FIG. 5, upon the television 101 as an OSD display. Here, if the user considers that he wishes to view some single section in particular within the television program which is being appointed for video recording, then he designates, with the time instant designation key, the time instant at the position at which he wishes to start viewing (i.e. the start of some single section within the television program) as the special replay stop time. In other words, the user designates, with the time instant designation key, his desired predetermined time instant within the time period that video recording is to be performed. In FIG. 5, by shifting the cursor 102 with the cursor keys, the user is able to designate three special replay stop times (for example "21:15", "21:35", and "22:50").

When the above video recording setting has been completed, the control unit 4 registers the video recording appointment information which has been set in the storage unit 6. And the control unit 4 times the present time instant with the timer circuit while referring to the video recording appointment information, and starts video recording when the present time instant reaches the date and time which have been appointed for video recording.

Next, the second scenario will be explained.

Figure 5:
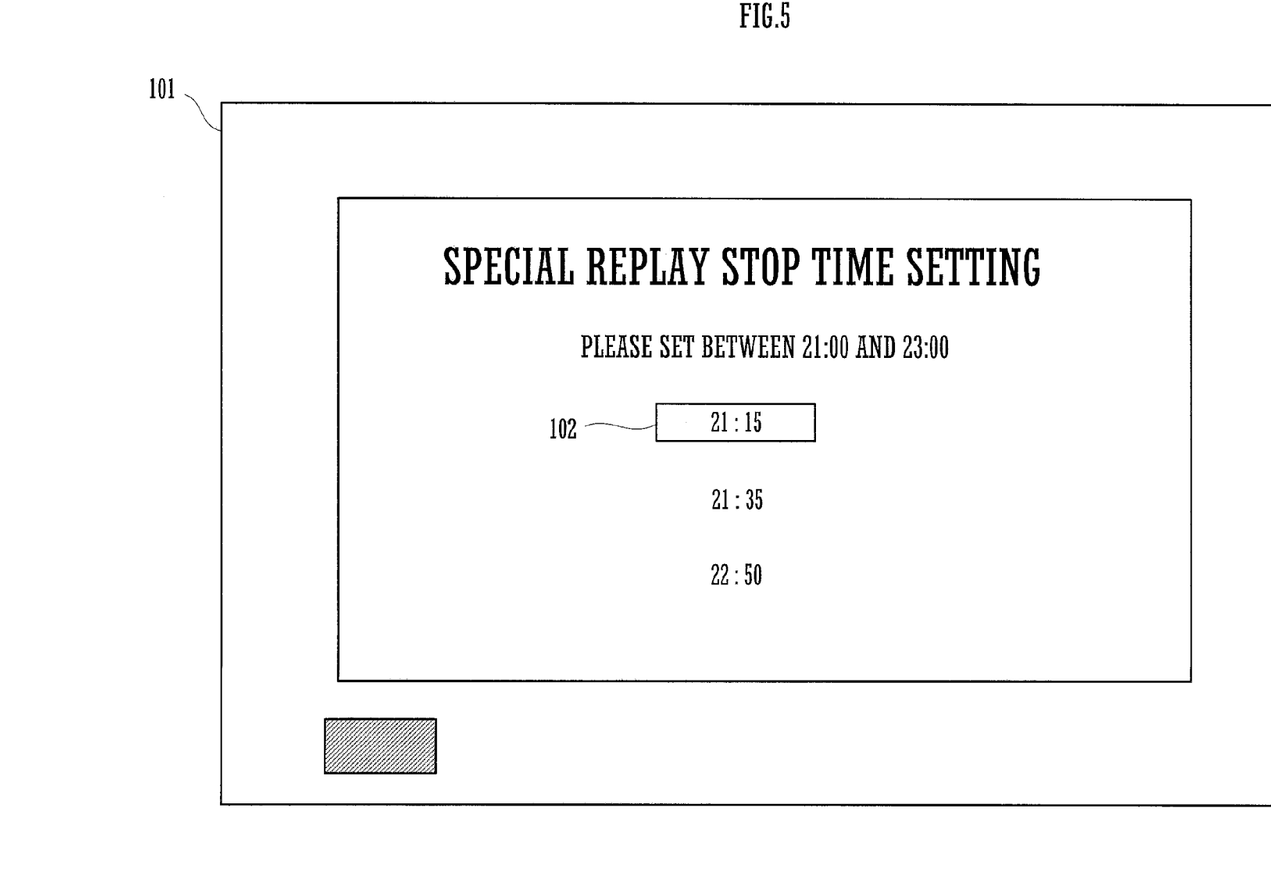
FIG. 5 is a figure showing an example of a setting screen for a special replay stop time, which is displayed upon the television 101.
Figure 6:
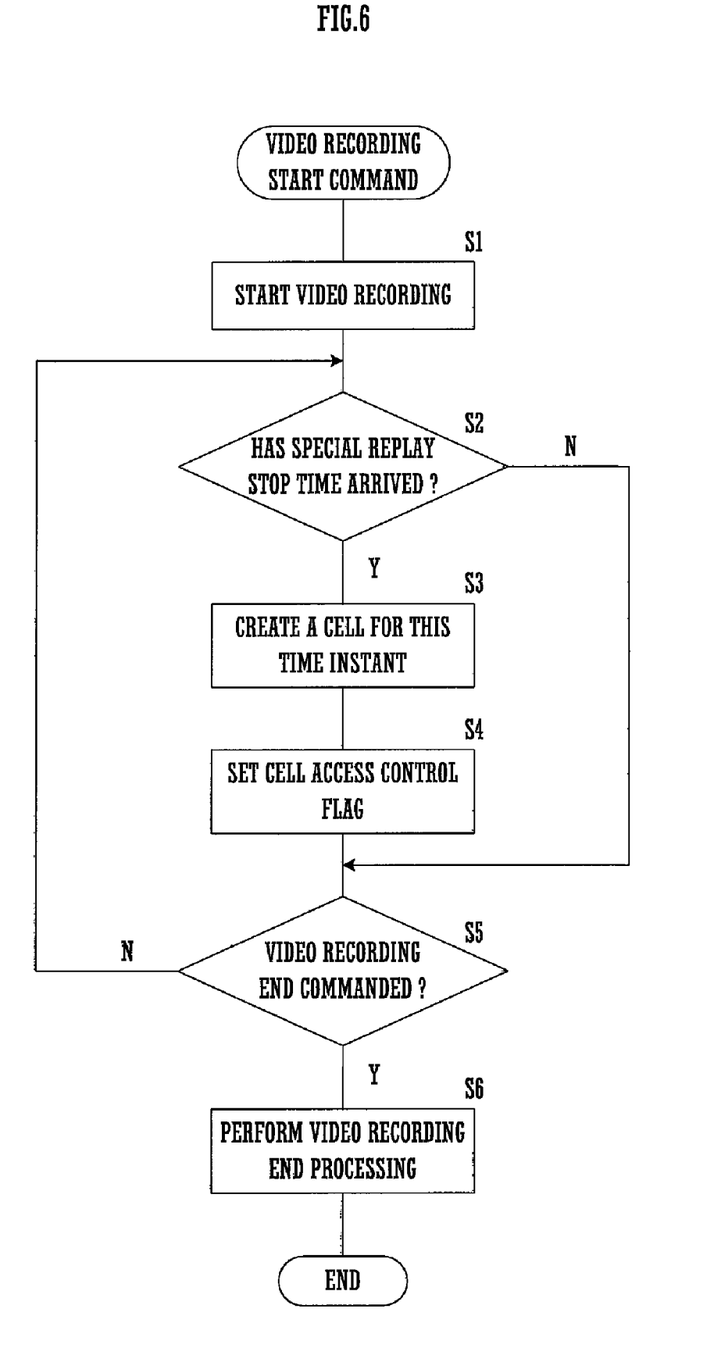
FIG. 6 is a flow chart showing operation performed by a control unit 4 of the optical disk device which is an embodiment of the present invention during video recording.
Figure 7:
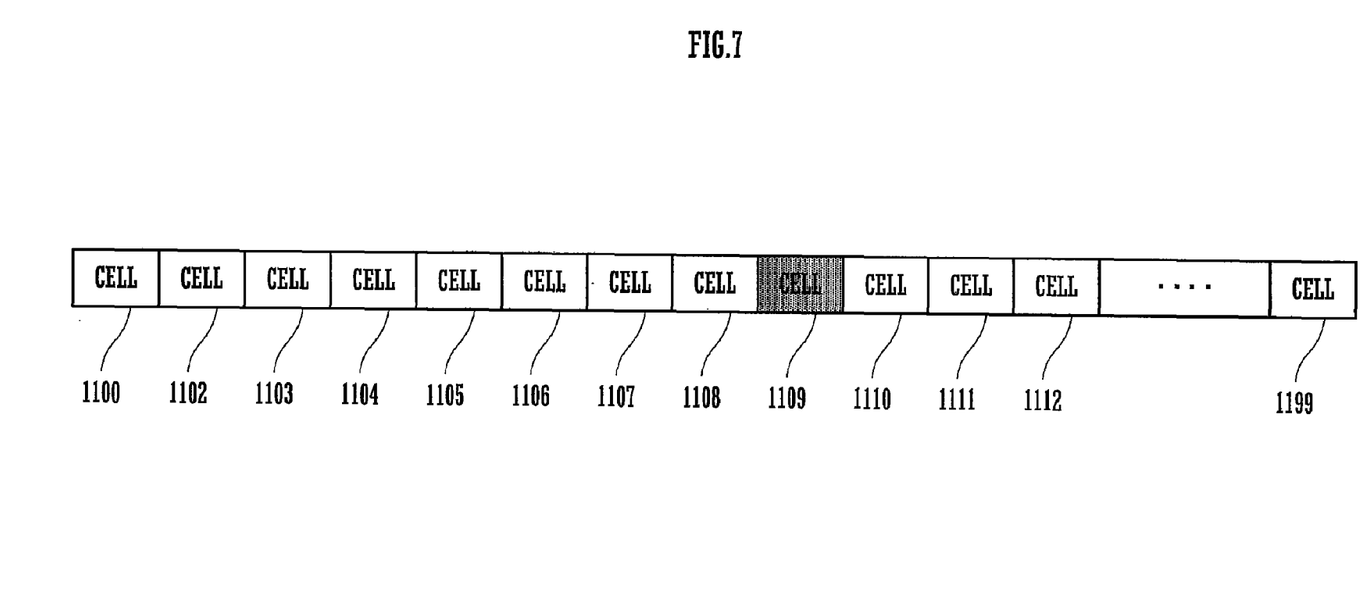
FIG. 7 is a figure showing the state of contents data which is video recorded upon an optical disk 100 cell by cell.

FIG. 6 is a flow chart showing the operation that is performed during video recording by the control unit 4 of this optical disk device which is an embodiment of the present invention. And FIG. 7 is a figure showing the state of contents data which is video recorded upon the optical disk 100 cell by cell. The operation shown in FIG. 6 is performed when (referring to the above example) either the date and time of "21:00" at which the video recording appointment has been made arrives, or the user depresses the video recording key. Although in FIG. 5 "21:15", "21:35", and "22:50" are displayed, for clarity of description, in FIG. 6, only the representative case in which "21:15" has been designated will be explained.

First the control unit 4 starts video recording upon the optical disk 100 (a step S1), while matching the reception channel of the reception unit 10 to the channel which was appointed for video recording. This video recording is performed in the DVD-VIDEO format. Due to this, the television program which was appointed is video recorded cell by cell upon the optical disk 100 (refer to FIG. 7).

And, until the video recording end date and time arrives (a step S5), the control unit 4 decides (a step S2) whether or not the present time instant has arrived at the special replay stop time of "21:15". In this embodiment, apart from setting the special replay stop time by the above described video recording appointment, during the video recording, the user may depress the time instant designation key and designate a predetermined time instant, so as to establish the state in which the special replay stop time is set. Here, if the time instant designation key is depressed during the video recording, then the control unit 4 sets the time instant at which this depression was performed as being the special replay stop time. And, in the step S2, the control unit 4 decides whether or not the present time instant has arrived at this special replay stop time.

When the present time instant arrives at the special replay stop time, first, the control unit 4 creates a cell in which to video record at the special replay stop time, and video records this cell upon the optical disk 100 (a step S3). In this embodiment, the following explanation will assume that the cell which is video recorded at the special replay stop time is the cell 1109.

Next, the control unit 4 sets a cell access control flag in the RAM (a step S4), this flag specifying the recording position upon the optical disk 100 of the cell 1109 which was video recorded at the special replay stop time. This cell access control flag is, for example, the cell number of the cell 1109 from the start. Since in this case the cell 1109 is the tenth from the start, as shown in FIG. 7, accordingly its cell number is "10".

Here the fact that during video recording the cell number is stored in RAM, is that, if in particular the video recording is performed at a variable bit rate, then it is not simple or easy to ascertain in advance, before the video recording, the relationship between the numbers of the cells which must be stored and the times they are stored.

Finally, when the end date and time for video recording arrives (a step S5), then the control unit 4 performs video recording end processing (a step S6), and then this processing terminates. In detail, during this video recording end processing, the control unit 4 creates a VTSI 1002 which describes the cell access control flag which is set in the RAM, and records it upon the optical disk 100. Thereafter, the control unit 4 may perform video recording of another title, creation of a VMGI 95, a VMGM_VOBS 96, a VMGIbup 97, and video recording and the like. Moreover, the control unit 4 performs the finalization described above upon the optical disk 100.

As described above, the optical disk device 1 performs video recording of the television program which has been appointed in the video recording appointment upon the optical disk 100, at the date and time which have been appointed. As a result, contents data which specifies the television program is recorded upon the optical disk 100 in the format shown in FIG. 3. Due to this, the user is able to video record the television program which he desires upon the optical disk 100.

Finally, the third scenario will be explained.

Figure 8:
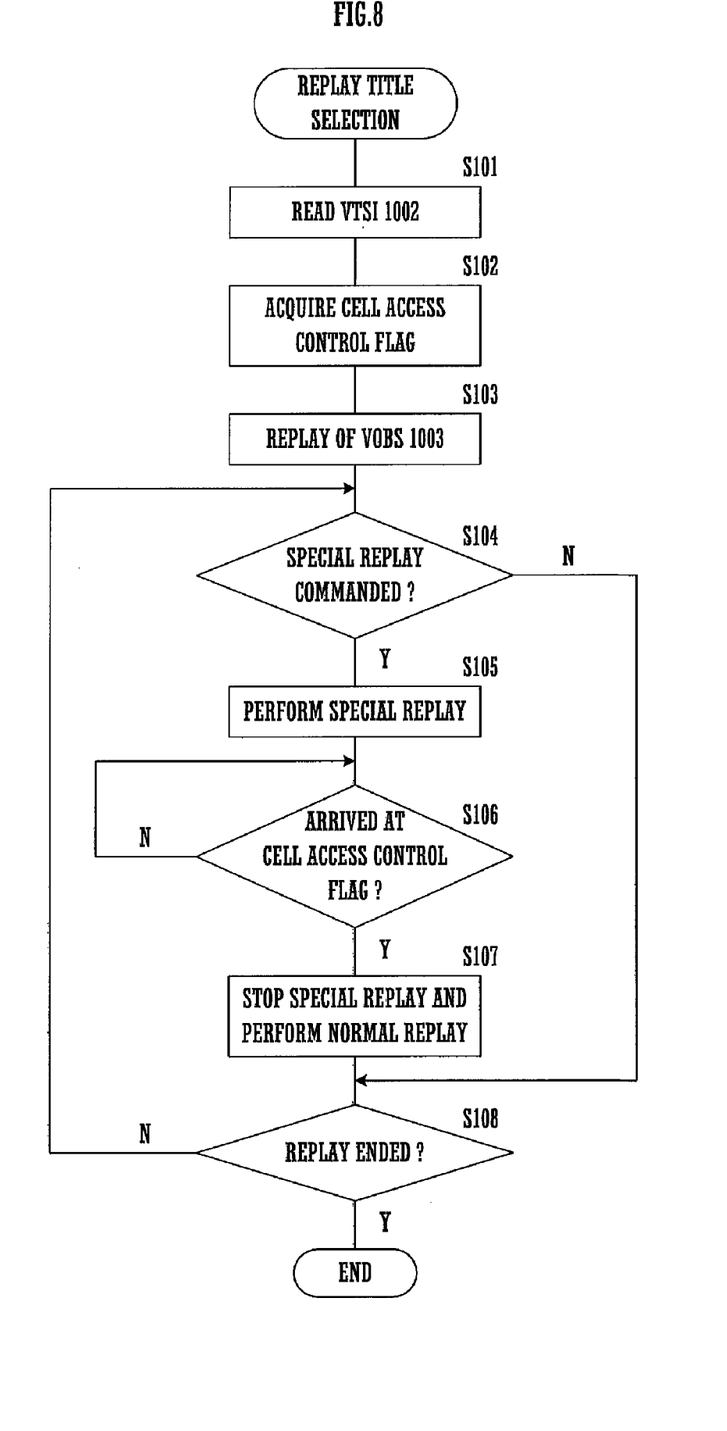
FIG. 8 is a flow chart showing operation performed by the control unit 4 of the optical disk device which is an embodiment of the present invention during replay.
Figure 9:
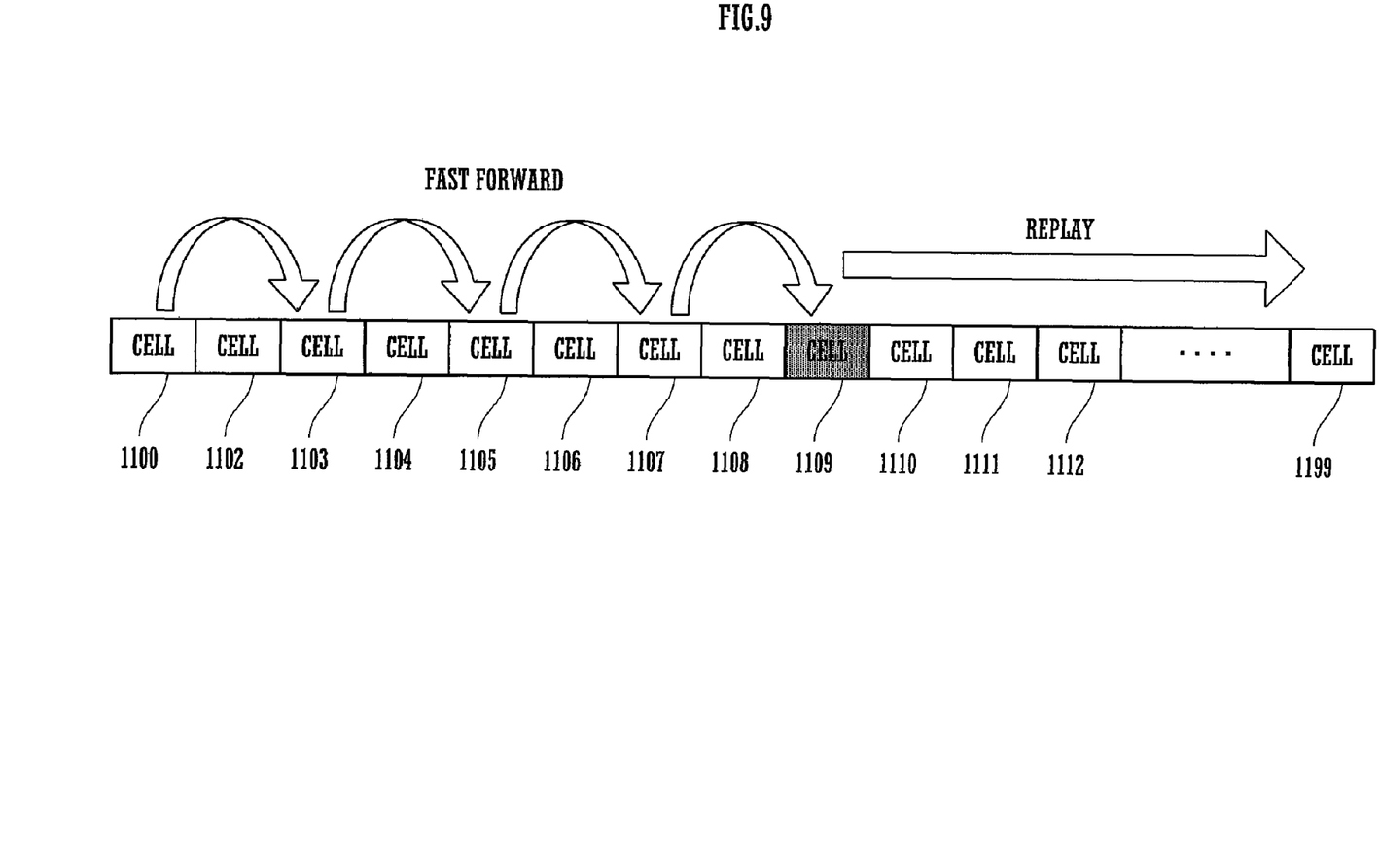
FIG. 9 is a figure showing the state of contents data which is replayed from the optical disk 100 cell by cell, when fast forwarding is performed.

FIG. 8 is a flow chart showing the operation that is performed by the control unit 4 of the optical disk device which is an embodiment of the present invention during replay. And FIG. 9 is a figure showing the state of contents data which is replayed from the optical disk 100 cell by cell, when fast forward has been performed. The operation shown in FIG. 8 is operation when the user has depressed the replay key and has selected the title T1.

First, the control unit 4 reads the VTSI 1002 in the title T1 (a step S101). Due to this, the control unit 4 acquires the control information related to the contents data which is stored in the VOBS 1003. The cell access control flag described above is included in this control information (refer to FIG. 3).

The control unit then analyzes the VTSI 1002 and acquires the cell access control flag (a step S102). Due to this, the control unit 4 ascertains the recording position upon the optical disk 100 of the cell which was video recorded at the special replay stop time of "21:15". In this example, the control unit 4 ascertains the cell number "10". This is because, in this example, the cell which was video recorded at the special replay stop time of "21:15" was the cell 1109 (refer to FIG. 9).

And the control unit 4 starts replay of the VOBS 1003 (a step 103). Due to this, the television program which was video recorded in the DVD-VIDEO format is replayed cell by cell from the optical disk 100.

Until this replaying of the title T1 ends (a step S108), the control unit 4 decides (a step S104) whether or not special replay, including fast forward or fast reverse, has been commanded. Here, a state is established in which the user is able to command special replay of the contents. In this embodiment, as a representative of special replay, the following explanation will assume that the user has depressed the fast forward key.

When fast forward is commanded, the control unit 4 performs fast forwarding of the contents (a step S105). Due to this, the control unit 4 performs replaying while skipping over a plurality of cells, corresponding to the replay speed which has been commanded (refer to FIG. 9).

And when, during execution of this fast forwarding, the cell 1109 of the cell access control flag is reached (a step S106), the control unit 4 stops the fast forwarding and performs normal replay (a step S107). Due to this, the optical disk device 1 performs replay at the normal replay speed from the head end of the cell 1109, in other words from the cells including the cell 1109 and subsequent cells (here, this is an example of the "performing said replay" of the Claims). Here, the cell 1109 is the cell which was video recorded at the time instant which the user designated with the time instant designation key. In other words, it is the cell at the position at which the user desires to start viewing (for example, the start of one section within the television program). Due to this, the optical disk device 1 reliably performs replay from the position at which the user desires to start viewing, without this position at which he wishes to start viewing being over-run due to the fast forwarding action.

Accordingly, the user is able to avoid reversing for a second time and returning to before the position at which he wants to start viewing, and then commanding replay for a second time, as sometimes happens in the case of a prior art optical disk device. Due to this, the user is able to reduce the labor which is required for this operation. Accordingly, with this optical disk device 1, it is possible to enhance the convenience of use from the point of view of the user.

Figure 10:
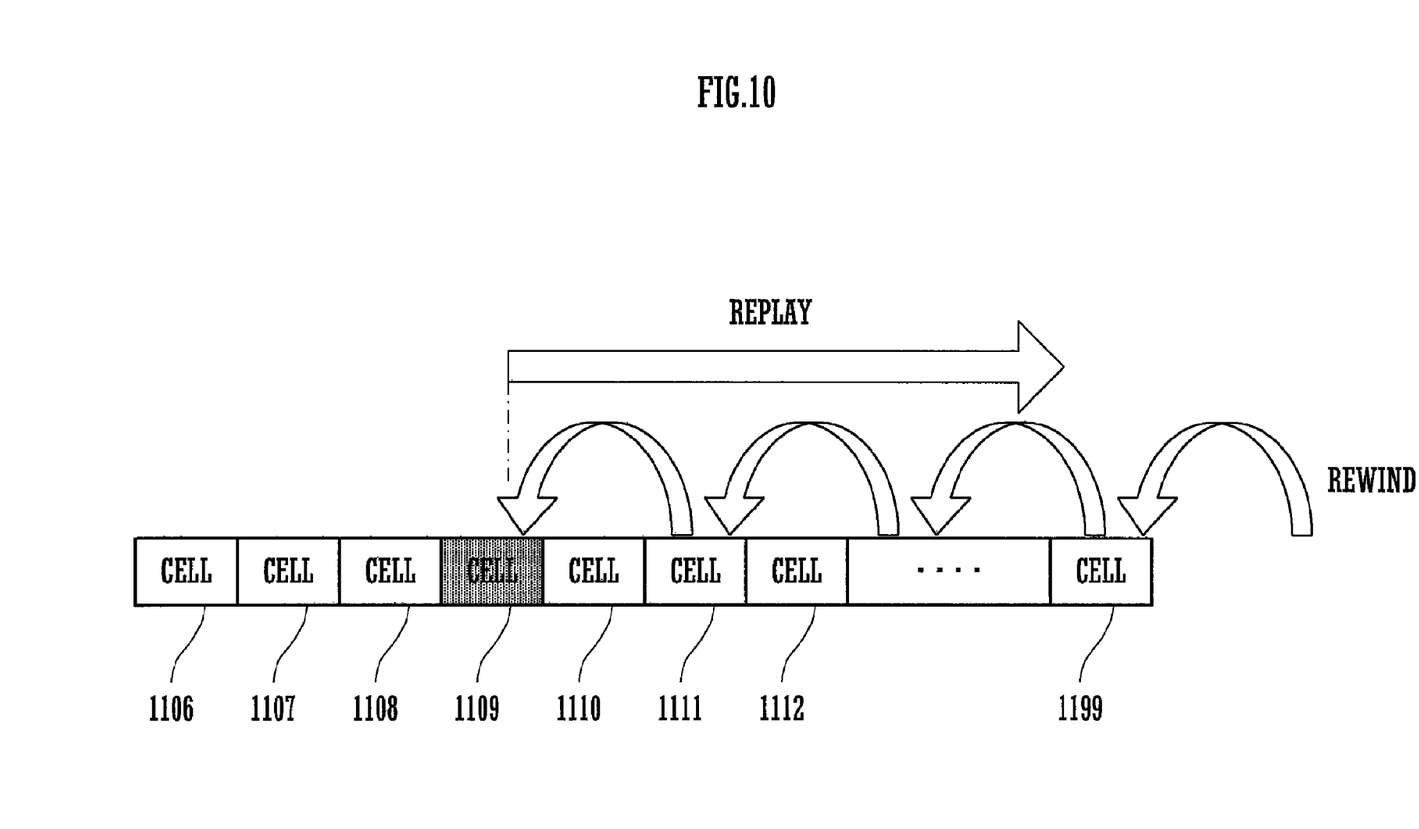
FIG. 10 is a figure showing the state of contents data which is replayed from the optical disk 100 cell by cell, when rewinding is performed.

Furthermore, the case of rewind replay is shown in FIG. 10. When performing replay (rewinding) in the opposite direction to the orientation in which replay is normally performed, the cells are read out and replayed at intervals of a plurality of cells. When the replay position has arrived at the cell 1109 for which the cell access control flag has been set, this replaying in the opposite direction is stopped, and the replay speed is controlled. Due to this, normal replay is started.

The examples of fast forward and of replay in the reverse direction shown in the above FIGS. 9 and 10 may not be performed at a higher speed than during normal replay; and, in such a case, normal replay is started even though the cell 1109 is reached while progressing at slow speed. Moreover, it would be the same also in the case of replaying in the opposite direction at the same speed as during normal replay. In other words, provided that the cell control flag is provided in the VTSI, whatever may be the replay speed and the replay direction previously, normal replay is started when the cell for which the flag is set is arrived at.

Moreover, as shown in FIG. 6, the optical disk 100 is video recorded based upon the DVD-VIDEO format. Due to this when, after finalization has been completed, the optical disk 100 is loaded into some other optical disk device which is compatible with the DVD-VIDEO format, this other optical disk device is able to perform the operation shown in FIG. 8 by reading the cell access control flag, stopping fast forwarding, and controlling normal replay. Accordingly, even upon some other optical disk device, it is possible for the user reliably to perform replay from the position at which he desires to start viewing, without the position at which he desires to start viewing being over-run. Therefore, the same advantageous effect as in the case of the optical disk device may be obtained with any other optical disk device as well. The same is the case for replay in the reverse direction.

The following variations of the embodiment of the present invention described above may be employed.

When the cell access control flag in FIG. 6 is set, the special replay stops at the head end of the cell 1109 for this flag, and normal replay is performed from this head end (refer to FIG. 9).

However, until the replaying of this cell 1109 terminates, it becomes impossible to perform special replay within the same cell. Even though, while making a video recording appointment, the user may have registered the position at which he wishes to start viewing, sometimes it happens that he changes his mind during replay. In this case, the user must wait to execute special replay, until the replaying of the cell 1109 is completed.

Thus, in the step S3 of FIG. 6, among all of the cells for which video recording is performed, the control unit 4 sets the amount of data in the cell 1109 to be small (it is desirable for this amount to be made the minimum unit amount), and performs video recording upon the optical disk 100. In concrete terms, since it is possible to record a plurality of VOBUs in a cell, and since it is possible to change the recorded data capacity in a cell changes by VOBU units, accordingly the control unit 4 is able to set the number of VOBUs which are stored in the cell 1109 to be the minimum of one. In this case, since one VOBU is 0.5 seconds, accordingly one cell takes 0.5 seconds in normal replay. Since, due to this, the replay of the cell 1109 ends almost immediately, accordingly the user is able to perform special replay upon the optical disk device almost immediately. Thus the convenience of use from the point of view of the user can be enhanced by yet a further level.

Furthermore, in the above embodiment, it would also be acceptable to provide, in FIG. 5, a plurality of special replay stop positions (positions for transition to normal replay). Moreover, corresponding to these stop positions, it would also be acceptable to provide a plurality of cell access control flags within the contents of each title; and it would be acceptable to provide a plurality of these flags within the contents of a single title.

What is claimed is:

1. An optical disk device, comprising:
   recording means which records contents data upon an optical disk cell by cell;
   replay means which:
      reads the contents data from the optical disk cell by cell;
      performs replay of the contents data; and
      performs special replay which differs from the replay by one or more of replay speed and replay direction; and
   actuation means which designates a desired predetermined time instant from within the time period over which recording is performed by the recording means,
   wherein during the recording, the recording means:
      minimizes a data amount in a predetermined cell which is recorded at the predetermined time instant designated by the actuation means, among all cells in which the contents data are recorded;
      records the predetermined cell upon the optical disk; and
      records, upon the optical disk, recording position information which specifies a recording position upon the optical disk of the predetermined cell, and
   wherein if the recording position information is recorded upon the optical disk, during performance of the special replay from the optical disk, when the special replay arrives at the predetermined cell which is present at the recording position specified in the recording position information, the replay means:

stops the special replay;

starts performing the replay from the predetermined cell; and prohibits performing the special replay during replaying the predetermined cell.

2. The optical disk device according to claim 1, wherein the recording means: records the contents data cell by cell upon the optical disk based upon a DVD-VIDEO format; and records upon the optical disk a cell access control flag, which is the recording position information.

3. The optical disk device according to claim 1, wherein the special replay is high speed replay at a replay speed which is faster than the replay by the replay means, or is opposite direction replay in which replay is performed in the opposite direction to the direction in which the replay is performed by the replay means.

4. The optical disk device according to claim 1, wherein the optical disk is a DVD.

* * * * *